(12) United States Patent
Odajima et al.

(10) Patent No.: US 7,989,522 B2
(45) Date of Patent: Aug. 2, 2011

(54) BIODEGRADABLE WAX COMPOSITION

(75) Inventors: Shingo Odajima, Tochigi (JP);
Nobuyuki Isshiki, Wakayama (JP);
Hitoshi Otsuka, Tochigi (JP); Hidetoshi Oga, Tochigi (JP); Minoru Goto, Tochigi (JP)

(73) Assignee: Kao Corporation, Tokyo (JP)

( * ) Notice: Subject to any disclaimer, the term of this patent is extended or adjusted under 35 U.S.C. 154(b) by 1022 days.

(21) Appl. No.: 10/574,849

(22) PCT Filed: Oct. 5, 2004

(86) PCT No.: PCT/JP2004/014658
§ 371 (c)(1),
(2), (4) Date: Dec. 11, 2006

(87) PCT Pub. No.: WO2005/033208
PCT Pub. Date: Apr. 14, 2005

(65) Prior Publication Data
US 2007/0078214 A1 Apr. 5, 2007

(30) Foreign Application Priority Data

Oct. 6, 2003 (JP) ................................ 2003-346889
Dec. 26, 2003 (JP) ................................ 2003-431698

(51) Int. Cl.
*C08J 3/20* (2006.01)
(52) U.S. Cl. ........ 523/351; 524/275; 524/277; 524/278; 524/279; 524/488; 524/487; 524/489
(58) Field of Classification Search .................. 523/351; 524/275, 277, 278, 279, 487, 488, 489
See application file for complete search history.

(56) References Cited

U.S. PATENT DOCUMENTS

| | | | | | |
|---|---|---|---|---|---|
| 2,413,239 | A | * | 12/1946 | Manson | 426/6 |
| 2,595,911 | A | * | 5/1952 | Young et al. | 524/487 |
| 4,207,221 | A | * | 6/1980 | Tobias et al. | 523/124 |
| 5,053,444 | A | * | 10/1991 | Trotoir | 523/351 |
| H1241 | H | * | 10/1993 | Synosky et al. | 426/3 |

FOREIGN PATENT DOCUMENTS

| | | |
|---|---|---|
| JP | 50-7802 | 1/1975 |
| JP | 59-66598 | 4/1984 |
| JP | 5-339557 | 12/1993 |
| JP | 7-278510 | 10/1995 |
| JP | 8-302166 | 11/1996 |
| JP | 2001-288295 | 10/2001 |
| JP | 2002-266284 | 9/2002 |
| JP | 2003-261129 | 9/2003 |
| JP | 2003-305816 | 10/2003 |
| JP | 2003-311868 | 11/2003 |
| JP | 2004-131575 | 4/2004 |
| JP | 2004-142426 | 5/2004 |
| JP | 2004-162037 | 6/2004 |
| WO | 03/070459 | 8/2003 |

* cited by examiner

*Primary Examiner* — Peter D Mulcahy
(74) *Attorney, Agent, or Firm* — Oblon, Spivak, McClelland, Maier & Neustadt, L.L.P.

(57) ABSTRACT

A biodegradable wax composition containing a wax as a main component and also containing a biodegradable polymer and a filler and having a moisture permeability of 3 g·mm/m$^2$·24 hr or less at 40° C. and 90% RH. The wax is preferably present in an amount of 65 to 95% by weight. The biodegradable polymer preferably has a weight average molecular weight of 200,000 or higher. The polymer is preferably polyisoprene or natural rubber and is preferably present in an amount of 5 to 35% by weight.

8 Claims, 1 Drawing Sheet

Fig.1

BIODEGRADABLE WAX COMPOSITION

TECHNICAL FIELD

The present invention relates to a biodegradable wax composition, a biodegradable laminate, and a process of producing a wax-based composition.

BACKGROUND ART

Wax-based compositions, such as moistureproof coatings, have been prepared mostly by mechanically mixing constituent components in their molten state (see JP-A-7-278510) or mixing a wax emulsion with other component (see JP-A-59-66598).

However, the above-described techniques have the following problems. When a solid or high-viscous substance is mixed into a molten wax by mechanical mixing, it has been difficult to uniformly disperse the substance because the viscosity of the molten wax is so low that sufficient shear force is not exerted on the substance to be mixed up. In using a wax emulsion, it is impossible to disperse a component whose particle size is equal to or smaller than that of the component constituting the emulsion, which has made it difficult to obtain a uniform disperse system.

A wax is widely used as an ingredient of moistureproof agents or hot-melt adhesives. The recent increasing awareness of environmental issues has boosted the demand for wax-containing materials to have biodegradability. There are various biodegradable waxes. Having extremely low melt viscosities, waxes are usually used as mixed with resins and the like.

For example, a biodegradable hot-melt adhesive composition mainly comprising a thermoplastic resin and a tackifier is known (see JP-A-5-339557). In the composition disclosed, at least one of the thermoplastic resin and the tackifier is polylactic acid or a lactic acid copolymer, and the composition contains 50% by weight or less of a wax. A biodegradable hot-melt adhesive composition comprising raw rosin, natural rubber, and a wax is also known (see JP-A-7-278510). These compositions do not have sufficient moistureproofness. Therefore, a film prepared by melt molding the composition is unfit for use as a liner of packaging materials and containers required to have moistureproofness. While the compositions have an increased melt viscosity over that of the wax used therein in view of nature of the use as a hot-melt adhesive, their melt viscosities are still not so high as to enable melt molding to produce T-die film or blown film by use of an extruder.

Among melt moldable, biodegradable compositions is the one disclosed in JP-A-2001-288295, which contains corn gluten meal and natural rubber as main components and is described as having high water resistance and high wet strength as well as biodegradability. The composition is, however, insufficient in moistureproofing performance similarly to the hot-melt adhesive compositions disclosed in JP-A-7-278510 and JP-A-59-66598 supra.

JP-A-2002-266284 discloses a coating composition providing a moistureproof coat. The composition is prepared by mixing natural rubber and natural wax using a solvent. However, the coating method using a solvent involves the smell and safety problem caused by a residual solvent in an intermediate or final product. To use a large quantity of a solvent also gives adverse influences on the natural environment and the working environment.

Hence, there has been no composition available that is melt moldable, sufficiently highly moistureproof, and biodegradable, nor a composition that is highly adhesive, sufficiently highly moistureproof, and biodegradable.

DISCLOSURE OF THE INVENTION

Problem to be Solved by the Invention

Accordingly, a first object of the present invention is to provide a process of producing a wax composition that can eliminate various disadvantages associated with the aforementioned related art.

A second object of the present invention is to provide a biodegradable wax composition that is excellent in moistureproofness and easy to melt mold.

Means for Solving the Problem

The present invention accomplishes the first object by providing a process of producing a wax composition containing a wax as a main component and a polymer and a filler as secondary components, which process includes the steps of kneading the wax and the polymer to prepare a wax/polymer composition containing the wax as a main component and kneading a filler into the wax/polymer composition.

The present invention accomplishes the second object by providing a biodegradable wax composition which contains a wax as a main component and a biodegradable polymer and a filler as secondary components, and has a moisture permeability of 3 g·mm/m$^2$·24 hr or less at 40° C. and 90% RH.

The present invention also provides a biodegradable laminate having a moistureproof layer made of the biodegradable wax composition of the invention and a biodegradable base layer on at least one side of the moistureproof layer.

DETAILED DESCRIPTION OF THE INVENTION

The biodegradable wax composition according to the present invention (hereinafter sometimes referred to simply as "the wax composition") will be described with reference to its preferred embodiments.

The wax composition of the present invention is mainly composed of a wax and contains a biodegradable polymer and a filler.

Containing a wax as a main component, the wax composition of the present invention develops sufficient moistureproofness. The wax composition of the present invention also secures biodegradability. The expression "to contain a wax as a main component" or "to be mainly composed of a wax" as used herein means that a wax constitutes the highest volume fraction of all the component ingredients in the composition. Sufficient moistureproofness is developed by the wax as a main component. To obtain enhanced moistureproofness, a preferred volume fraction of a wax is higher than 40%, more preferably higher than 50%.

The wax composition of the present invention has a moisture permeability of 3 g·mm/m$^2$·24 hr or less, preferably 2 g·mm/m$^2$·24 hr or less, more preferably 1 g·mm/m$^2$·24 hr or less, in an environment of 40° C. and 90% RH. There is no lower limit of the moisture permeability. The lower, the better.

The moisture permeability as referred to herein is a water vapor transmission rate of a film with a prescribed thickness molded of the wax composition, converted to a value of 1 mm thick film, measured in accordance with the dish method (JIS Z0208, condition B). Assuming that the moisture permeability is in inverse proportion to film thickness, the converted value of moisture permeability is obtained by multiplying the moisture permeability as determined by the dish method by the film thickness. It is often difficult to measure moisture permeability of a film made solely of a wax composition by the above-specified method. In such cases, a laminate film composed of a biodegradable resin film having a known moisture permeability and a film of the wax composition is prepared for the measurement of moisture permeability of the wax composition. For example, a three-layered film having a structure of biodegradable resin layer (A)/wax composition layer (B)/biodegradable resin layer (C) is prepared, and the moisture permeability d of the three-layered film is measured by the above-described method. Separately, the moisture permeabilities a and c of the biodegradable resin layer (A) and the biodegradable resin layer (C), respectively, are measured in the same manner. The moisture permeability of the wax composition layer (B) being taken as b, the following relationship can be given, in which a, b, c, and d are values as measured but not converted to 1 mm thickness values.

$$1/d = 1/a + 1/b + 1/c$$

The unknown moisture permeability b of the wax composition layer (B) can be calculated from the relationship.

As previously stated, the wax composition contains a wax as a main component. In order to achieve the above-recited low moisture permeability with ease, the wax composition preferably contains a wax in a proportion of 65% to 95% by weight, more preferably 70% to 85% by weight. When the wax composition contains a high-specific-gravity material, such as inorganic powder, as described infra, the volume fraction of a wax is preferably 60% to 95%, more preferably 70% to 85%.

In order to secure biodegradability of the wax composition of the present invention, it is preferred to use a wax having a biodegradability (JIS K6950 or JIS K6953) of 30% or higher, more preferably 50% or higher, even more preferably 60% or is higher. As will be explained later, where the wax composition contains an inorganic filler, the biodegradability of only organic matter is measured.

It is preferred for the wax as a main component to have a melting point of 40° C. or higher, more preferably 60° C. or higher, as measured in accordance with JIS K2235-5.3, in view of storage stability of the wax composition of the invention and a molded product obtained from the wax composition by melt molding.

Waxes that can be used include plant waxes, animal waxes, mineral waxes, petroleum waxes, and synthetic waxes. These waxes can be used either individually or as a combination of two or more thereof. Examples of usable waxes are described in Kenzo Fusegawa, Wax no seishitu-to-ohyo, 2nd Ed., Saiwai Shobo, 1993, 2, Table 1.0.1. The plant waxes include rice wax, carnauba wax, Japan wax, and candelilla wax. The animal waxes include bees wax, lanolin, and whale wax. The petroleum waxes include microcrystalline wax and paraffin wax. The synthetic waxes include polyethylene wax and Fisher-Tropsch wax. Examples of the mineral waxes are montan wax, ozokerite, and ceresin. Although any of these waxes can be used preferably, it is advisable to use a wax having a small low-melting component content where a mixer with sufficient cooling capacity is not available because a low-melting component in a wax can melt with a temperature rise due to shear heat generation during kneading to reduce the viscosity of the wax, which can result in a failure to exert a sufficient shear force to the component to be mixed. For the same reason, it is preferred to use a wax having a small amorphous component content. There are some applications in which a wax composition is required to have some tack at ambient temperature. In such applications, it is preferred for the wax to contain an appropriate amount of a low-melting component or an amorphous component as long as the mixing operation is not heavily affected. From this viewpoint, a wax having a melting point of 40° C. or higher, preferably 60° C. or higher, as measured in accordance with JIS K2235-5.3.2 is suitable.

The filler that can be used in the present invention denotes particulate substances of organic or inorganic matter or organic/inorganic composite matter. In using a non-biodegradable inorganic filler, the amount of the inorganic filler to be added is preferably less than 30% by weight for securing the effects of the biodegradability of the wax composition. In order to increase the viscosity of the wax composition to gain melt flow characteristics fit for melt molding, the amount of the inorganic filler is preferably 1% by weight or more, more preferably 2% by weight or more, even more preferably 3% by weight or more. Taking it into consideration that addition of a filler can result in reduction of adhesion to a biodegradable film, etc., the amount of the inorganic filler to be added is preferably 30% by weight or less, more preferably 25% by weight or less, even more preferably 10% by weight or less.

The inorganic filler includes anhydrous silica, mica, talc, titanium oxide, calcium carbonate, diatomaceous earth, allophane, bentonite, potassium titanate, zeolite, sepiolite, smectite, kaolin, and carbon. These inorganic fillers cannot be said to be biodegradable but do not become an environmental burden because most of inorganic fillers essentially occur in nature. While it is recommended to use a naturally-occurring inorganic filler, use of a synthetic inorganic filler in about the amount recited above is of no problem because a wax composition with such a level of the inorganic filler content is classified into wastes that can be disposed of with no particular restrictions by laws or ordinances.

The organic fillers to be used are required to have biodegradability. The organic fillers are preferably composed of biodegradable aliphatic polyester resins, biodegradable aliphatic polyester-aromatic polyester copolymer resins, or biodegradable aliphatic polycarbonate resins. Specific examples include polyethylene succinate (PES), polybutylene succinate (PBS), polylactic acid (PLA), polyglycolic acid (PGA), polyhydroxybutyrate (PHB), polycaprolactone (PCL), a polycaprolactone-polybutylene succinate mixture or copolymer (PCL/PBS), a polyhydroxybutyrate-polyhydroxyvalerate copolymer (PHB/PHV), a polybutylene succinate-polybutylene adipate mixture or copolymer (PBS/PBA), a polyethylene terephthalate-polyethylene succinate copolymer (PET/PES), and a polybutylene terephthalate-polybutylene adipate copolymer (PBT/PBA). Powders of naturally occurring organic substances, such as raw or processed starch, pulp, chitin/chitosan, coconut shell, wood powder, bamboo powder, bark powder, kenaf, and straw, are also useful.

The filler preferably has an average particle size of about 5 nm to 50 μm, more preferably about 10 nm to 10 μm, in view of uniform kneadability with the wax and a polymer such as polyisoprene or natural rubber (hereinafter described) and for securing the effect of viscosity increase. The filler is incorporated by, for example, feeding into a kneader in kneading the wax and a polymer to prepare a wax composition.

The biodegradable wax composition of the present invention preferably has a melt flow rate (hereinafter abbreviated as MFR) of 0.1 to 1000 g/10 min, more preferably 0.5 to 100 g/10 min, even more preferably 1 to 30 g/10 min, at 125° C. under a load of [[1.2 kgf]] 1.2 kgf (11.76N). In other words, the biodegradable wax composition of the present invention exhibits melt flow characteristics suitable for melt molding using an extruder. Accordingly, the biodegradable wax composition of the invention can easily be molded into film by T-die extrusion or blown-film extrusion.

The polymer referred to above is used for the purpose of modifying the physical properties of the wax in a solid or molten state or imparting a desired function to the wax. For instance, the polymer is used for improving the mechanical strength of the wax in a solid state including breaking strength, impact strength, and bending strength, imparting flexibility, improving adhesion to an adherent, or improving melt viscosity in a molten state.

The polymer to be used includes non-crystalline (amorphous) polymers and crystalline polymers, such as unvulcanized rubber and the aforementioned biodegradable aliphatic polyester resins, aliphatic polyester-aromatic polyester copolymer resins, and aliphatic polycarbonate resins. In order to finely disperse the polymer, the crystalline polymer is preferably one melting at a desired mixing temperature, which is lower than the melting completion temperature of the wax; and the amorphous polymer is preferably one whose glass transition temperature is not higher than a desired mixing temperature, which is lower than the melting completion temperature of the wax. Preferred of them are those which are amorphous and have compatibility with the wax at or above the melting point of the wax. Polyisoprene and natural rubber are especially preferred.

Incorporating a polymer into the wax composition results in an increased melt viscosity as hereinafter described, but addition of a polymer tends to impair the moistureproofness of the resulting wax composition. As a result of extensive researches, the present inventors have found that incorporating polyisoprene or natural rubber into the composition as a polymer increases the melt viscosity without reducing the moistureproofness of the wax composition. Combining polyisoprene or natural rubber and the above-described wax secures biodegradability. Moreover, incorporating polyisoprene or natural rubber brings about another advantage that molded products obtained from the resulting wax composition exhibit improvements in heat resistance and strength.

The biodegradable wax composition of the present invention which contains too large an amount of the polymer such as polyisoprene or natural rubber can have too high a melt viscosity that impairs processability including melt moldability. It also tends to have reduced moistureproofness. Conversely, the wax composition containing too small an amount of the polymer such as polyisoprene or natural rubber can fail to have sufficiently increased melt viscosity. Taking these tendencies into consideration, the amount of the polymer such as polyisoprene or natural rubber to be compounded into the wax composition which is preferred for obtaining melt flow characteristics fit for melt molding without reducing moistureproofness of the wax composition is in a range of from 5% to 35% by weight, more preferably from 15% weight to 30% by weight.

The present inventors have ascertained that proper control of the molecular weight of polyisoprene or natural rubber is advantageous for obtaining the wax composition of the present invention which exhibits melt flow characteristics suitable for melt molding. Taking polyisoprene, for instance, use of polyisoprene having a weight average molecular weight controlled above 200,000, preferably above 400,000, more preferably above 700,000, makes it easy to provide the wax composition with melt flow characteristics fit for melt molding. While there is no particular upper limit of the weight average molecular weight from the viewpoint of increasing the melt viscosity, the upper limit preferred for ease in preparing the wax composition would be 4,000,000, more preferably 2,000,000. The weight average molecular weight is measured, for example, as follows. A wax composition is dissolved in chloroform, and the insoluble wax is removed by filtration. The resultant filtrate is analyzed by GPC. The weight average molecular weight of the polymer is obtained from the results and a calibration curve prepared using standard polystyrene samples with known molecular weights.

The molecular weight of polyisoprene or natural rubber can be controlled during preparation of the wax composition of the invention. For example, while a wax and polyisoprene or natural rubber are being kneaded, the molecular chains of polyisoprene or natural rubber can be severed by a mechanical shear force under adjusted conditions including kneading time, shear force, and temperature, or the molecular chains can be severed by oxidation reaction induced by the heat of kneading. In general, as kneading continues, polyisoprene or natural rubber tends to reduce in molecular weight, and the wax composition tends to increase in MFR. Therefore, it is desirable for maintaining the melt viscosity high to knead the composition uniformly while minimizing molecular weight reduction.

The wax composition of the present invention can be processed into pellets, which are fed into an ordinary extruder and melt molded. The pellets are liable to stick to each other depending on the kinds of the wax and other components such as the biodegradable polymer and the compounding ratio. It is therefore recommended to provide the surface of the pellets with an anti-sticking powder. Pelletization can be conducted in a usual manner for making resin pellets. The above-described inorganic fillers can be used as the anti-blocking powder. The inorganic filler is preferably used in an amount of 0.5 to 5 parts by weight, more preferably 1 to 3 parts by weight, per 100 parts by weight of the wax composition. Within that preferred range, the inorganic filler produces both the anti-blocking effect and the melt flow characteristics improving effect.

The wax composition of the present invention can be applied in its molten state to, for example, the surface of a biodegradable container.

The biodegradable laminate according to the present invention will then be described based on its preferred embodiment.

The biodegradable laminate of the present embodiment is composed of a moistureproof layer made of the above-described wax composition of the present invention and a biodegradable base layer provided on at least one side of the moistureproof layer.

The biodegradable laminate according to the present embodiment is a multilayer moistureproof biodegradable film which is obtained by melt molding the wax composition of the present invention by T-die extrusion or blown-film extrusion to form a moistureproof layer and laminating the moistureproof layer, on at least one side thereof, with a biodegradable resin layer (i.e., a biodegradable base layer). In a preferred embodiment, the biodegradable film has a three-layered structure having the biodegradable resin layer on both sides of the moistureproof layer.

The biodegradable film exhibits moistureproofness by virtue of the moistureproof layer. The moistureproofness of the biodegradable film is preferably such that the moisture permeability, converted to a value of 1 mm thick film, measured in accordance with the dish method (JIS Z0208, condition B) is 2 g·mm/m$^2$·24 hr or less, more preferably 1 g·mm/m$^2$·24 hr or less. The moisture permeability is calculated in the same manner as described supra with respect to the moisture permeability of the wax composition. It is often difficult to measure moisture permeability of a film made solely of the wax composition by the above-specified method. In such cases, a laminate film composed of a biodegradable resin film having a known moisture permeability and a film of the wax composition is prepared for the measurement of moisture permeability of the wax composition. For example, a three-layered film having a structure of biodegradable resin layer (A)/wax composition layer (B)/biodegradable resin layer (C) is prepared, and the moisture permeability d of the three-layered film is measured by the above-described method. Separately, the moisture permeabilities a and c of the biodegradable resin layer (A) and the biodegradable resin layer (C), respectively, are measured in the same manner. The moisture permeability of the wax composition layer (B) being taken as b, the following relationship can be given, in which a, b, c, and d are values as measured but not converted to 1 mm thickness values.

$$1/d=1/a+1/b+1/c$$

The unknown moisture permeability b of the wax composition layer (B) can be calculated from the relationship.

Where the biodegradable film is used to laminate the surface of a biodegradable container body, it is preferred for the biodegradable film to have thermoformability. When a biodegradable film, clamped by both ends thereof and heated to a predetermined temperature, can be pulled uniaxially in opposite directions to double its length without breakage, the film is said to be thermoformable. The heating temperature for thermoforming the biodegradable film is decided appropriately according to the biodegradable resin used, the wax used in the moistureproof layer, and the thermoforming method (e.g., vacuum and/or pressure forming or pressing). The heating temperature should be selected so that the biodegradable film is shaped with an acceptable thickness distribution over the whole area while assuring sufficient moistureproofness. It is important for obtaining sufficient moistureproofness to conduct thermoforming at a heating temperature at which unevenness of film thickness can be minimized. A heating temperature satisfying these requirements can be decided by optimization techniques generally practiced by those skilled in the art.

A heating temperature for testing whether or not the biodegradable film is thermoformable should be a temperature at which actual thermoforming can provide similarly satisfactory results. The temperature ranges shown below serve as a measure for optimization. Selecting the temperature condition within these ranges often provides satisfactory results. Where the biodegradable resin is a crystalline resin, the temperature range is from (Tm−40° C.) to (Tm+20° C.), wherein Tm is a melting peak temperature (° C.) read from a melting curve obtained by DSC analysis (hereinafter "DSC curve"). When there are two or more melting peaks, the melting peak having the highest heat of fusion is chosen. Where the biodegradable resin is an amorphous resin, the range is from Tg (of the resin) to (Tg+50° C.).

In order for the biodegradable film to degrade in a practically acceptable time, it is preferred that the biodegradable film to have a biodegradability (i.e., ultimate aerobic biodegradability according to JIS K6950 or K6953) of 30% or higher, more preferably 50% or higher, even more preferably 60% or higher. With this preferred biodegradability, the film will degrade in 2 to 3 months in a compost bin, etc.

The biodegradable film is produced by, for example, melt co-extrusion through a multi-manifold type T-die using the biodegradable wax composition that provides the moistureproof layer and a biodegradable resin that provides the biodegradable resin layer. Since the biodegradable wax composition has flow characteristics suited to melt molding as previously mentioned, the co-extrusion can be successfully accomplished. The resulting extruded film is stretched uniaxially or biaxially, when necessary.

The biodegradable film preferably has a total thickness of 10 to 2000 μm, more preferably 20 to 1000 μm, from the standpoint of film strength and formability. The thickness of the biodegradable resin layer in the biodegradable film can be selected appropriately according to necessity. It is preferably 5 to 1000 μm, more preferably 10 to 500 μm, for film strength and ease of film handling. The thickness of the moistureproof layer is preferably 1 to 500 μm, more preferably 10 to 100 μm, for assuring practical moistureproofness and retaining the biodegradable film strength in high temperatures.

The biodegradable resin layer of the biodegradable film is preferably made of biodegradable aliphatic polyester resins, biodegradable aliphatic polyester-aromatic polyester copolymer resins, or biodegradable aliphatic polycarbonate resins. Examples of these resins are polyethylene succinate (PES), polybutylene succinate (PBS), polylactic acid (PLA), polyglycolic acid (PGA), polyhydroxybutyrate (PHB), polycaprolactone (PCL), a polycaprolactone-polybutylene succinate mixture or copolymer (PCL/PBS), a polyhydroxybutyrate-polyhydroxyvalerate copolymer (PHB/PHV), a polybutylene succinate-polybutylene adipate mixture or copolymer (PBS/PBA), a polyethylene terephthalate-polyethylene succinate copolymer (PET/PES), and a polybutylene terephthalate-polybutylene adipate copolymer (PBT/PBA). These resins can be used either individually or as a combination of two or more thereof.

In order for the biodegradable film to degrade in a practical time period, the biodegradable resin layer preferably has a biodegradability (i.e., ultimate aerobic biodegradability according to JIS K6950 or K6953) of 30% or higher, more preferably 50% or higher, even more preferably 60% or higher.

The biodegradable film can be applied to the surface of a biodegradable container body to provide a biodegradable container. When the biodegradable film has a double layer structure composed of the moistureproof layer and the biodegradable resin layer, the biodegradable film is disposed with the biodegradable resin layer facing the direction opposite to the container body. The container body is not particularly limited in material as long as the material is biodegradable. The biodegradability (ultimate aerobic biodegradability according to JIS K6950 or K6953) of the container body is preferably 30% or higher, more preferably 50% or higher, even more preferably 60% or higher. The material of the container body includes fibers, such as natural fibers and biodegradable synthetic fibers, natural polymers, the above-described biodegradable resins, and mixtures of these materials. The natural fibers include wood pulp fiber, non-wood pulp fiber, silk, and wool. The biodegradable synthetic fibers include polylactic acid fiber, vinylon, and rayon. The natural polymers include starch and proteins. The container body is not particularly limited in shape and includes cups, bowls, bottles, plates, boxes, monkey dishes, and cylinders.

The part of the container body to be covered or laminated with the biodegradable film is arbitrarily selected according to the use, the shape, etc. of the container. For example, the inner side and/or the outer side of a container body can be laminated with the biodegradable film. In the case of cups and like containers, it is preferred to laminate at least the inner side of the container body with the biodegradable film.

The container body can be laminated with the biodegradable film by applying an adhesive between the container body and the biodegradable film or by direct lamination. The adhesive that can be used is not particularly limited in composition as long as it is biodegradable. Similarly to the biodegradable film, it is preferred for the adhesive to have a biodegradability (i.e., ultimate aerobic biodegradability according to JIS K6950 or K6953) of 30% or higher, more preferably 50% or higher, even more preferably 60% or higher. Useful adhesives include starch, polyvinyl alcohol, glue, gelatin, casein, unvulcanized natural rubber, and unvulcanized polyisoprene. A biodegradable resin or a natural resin having a lower melting point than the biodegradable resin layer facing to the container body is also employable as an adhesive that serves to adhere the biodegradable film to the container body on heat melting. In using a solvent type adhesive that develops adhesiveness on evaporation of the solvent, a solution containing an adhesive component is applied to at least one of the biodegradable film and the container body. It is possible to bond the biodegradable film and the container body by forming a layer of the adhesive component on one of them and applying the solvent to the other. Direct lamination can be carried out by, for example, disposing the biodegradable film on the inner side of the container body and vacuum- or pressure-forming the film while heating the container body from the outer side.

The biodegradable film enjoys broad applications. It is used to cover the surface of a biodegradable container body as previously stated. Additionally, it is useful as a packaging film for various applications or as a film for laminating paperboard (biodegradable paper) to produce biodegradable moistureproof paper (e.g., laminate paper). Such biodegradable moistureproof paper can be shaped by bending or forming into biodegradable containers of cup shape, box shape, etc.

The wax composition according to the present invention is prepared through various processes. As an example, a wax and a polymer such as polyisoprene or natural rubber are put in a kneader, such as a pressure kneader, and kneaded under a strong shear force to obtain the wax composition. In particular, the process of producing a wax composition according to the present invention, which will be described later, is suitable to produce the wax composition of the present invention. In another process, a polymer such as polyisoprene or natural rubber is dissolved in a solvent, e.g., n-heptane, and a wax is then dissolved in the solution, followed by removing the solvent by, for example, vaporization.

The former process using no solvent is preferred; for it is free from the residual solvent problem, environmentally friendly, and less costly. Considering that polyisoprene and natural rubber tend to markedly reduce their molecular weight through oxidation on being heated, a heating operation, if involved, is preferably carried out in a nitrogen atmosphere for a minimized time. Where the wax composition is prepared using a solvent, care should be taken because the molecular weight tends to reduce while the solvent is being vaporized, which can result in considerable reduction of the melt viscosity.

The process of producing a wax composition according to the present invention will be described based on its preferred embodiment.

Before being fed to a kneader, the wax is preferably processed into pellets or particles of appropriate size (for example, an average diameter of 2 to 10 mm or fine powder of 1 mm or smaller) by means of a grinder or an extruder or by melt cooling granulation or like means.

The wax composition of the present invention can appropriately contain antioxidants, colorants, dispersing aids, and other compounding additives where needed as long as the kneading operation is not influenced.

The kneader that can be used in the present invention includes those known per se, such as a pressure kneader having two counter-rotating kneading blades.

The process of producing the wax composition containing the above-mentioned components will be described. In a preferred embodiment of the process of producing a wax composition of the present invention, a wax composition is obtained by mixing the above-described wax and the above-described components to be mixed with the wax in a kneader at a temperature lower than the melting completion temperature of the wax, preferably at a temperature not higher than the melting peak temperature read from a DSC curve of the wax. When the DSC curve has two or more melting peaks, the mixing temperature is preferably a temperature not higher than the peak temperature of the peak having the greatest heat of fusion. When mixing is conducted under such a temperature condition, abrupt reduction of viscosity due to melting of the wax does not occur so that a sufficient shear force is imposed to the component to be mixed to provide a uniform wax composition. As long as the mixing temperature is lower than the wax's melting completion temperature, there remain unmelted crystals of the wax, with which the wax can behave seemingly as a high-viscosity fluid. As a result, mixing of the wax and the other components can be effected in a manner commonly practiced in preparing a plastic material compound.

A more preferred mixing temperature can be decided as follows. The total endotherm of the melting wax component is taken as $\Delta H$. Mixing can be carried out more satisfactorily at such a temperature that the ratio of the endotherm $\Delta H'$ in the side of lower temperatures than the mixing temperature to the total endotherm $\Delta H$ ($\Delta H'/\Delta H$) is 0.7 or smaller, more preferably 0.5 or smaller, even more preferably 0.3 or smaller. Mixing at lower temperatures than the melting start temperature of the wax is not problematic. It is sometimes desirable for obtaining a uniform mixture that the wax, particularly, a highly crystalline, hard wax to have body at a mixing temperature. In such a case, the lower limit of the mixing temperature is preferably set so that the $\Delta H'$ to $\Delta H$ ratio may be 0.03 or greater, more preferably 0.05 or greater. Where mixing is conducted at a temperature close to or lower than the melting start temperature of the wax, it is possible, from the same viewpoint as mentioned above, to add an oil having a wax plasticizing effect to the system in a proper amount (preferably in an amount resulting in a content of 20% by weight or less, more preferably 10% by weight or less, in the wax composition).

The optimal mixing temperature is appropriately chosen from the above-recited temperature range in accordance with the physical properties of the component to be mixed with. For example, an amorphous polymer is preferably mixed at or above its glass transition temperature; and a crystalline polymer is preferably mixed at or above its melting point. Organic or inorganic powder is preferably mixed at a temperature sufficiently lower than the wax's melting completion temperature (e.g., a temperature lower than the wax's melting start temperature) so that uniform dispersion of the powder may be achieved more easily. Mixing is preferably conducted at or above the glass transition temperature of the wax nevertheless. If the mixing temperature is lower than the wax's glass transition temperature, the wax is too hard, which can result in adverse influences, such as deterioration of the disperse condition and an excessive load imposed on mixing equipment. It is preferred that the mixing temperature be adjusted within the above-recited preferred range so that both the wax and the component to be mixed therewith may be in their most suitable physical conditions for mixing, with due considerations given to the temperature dependence of the physical properties of the wax and the component.

The melting completion temperature, the melting peak temperature, and the ΔH' to ΔH ratio (ΔH'/ΔH) of the wax used in the present invention are determined, for example, as follows.

Instrument: DSC 220 from Seiko Instruments, Inc.

Sample container: PN/50-020 (15 μl-volume, aluminum-made open pan) and PN/50-021 (aluminum-made lid for crimping)

Sample weight: about 10 mg

Rate of temperature rise and fall: 5° C./min

Figure 1:
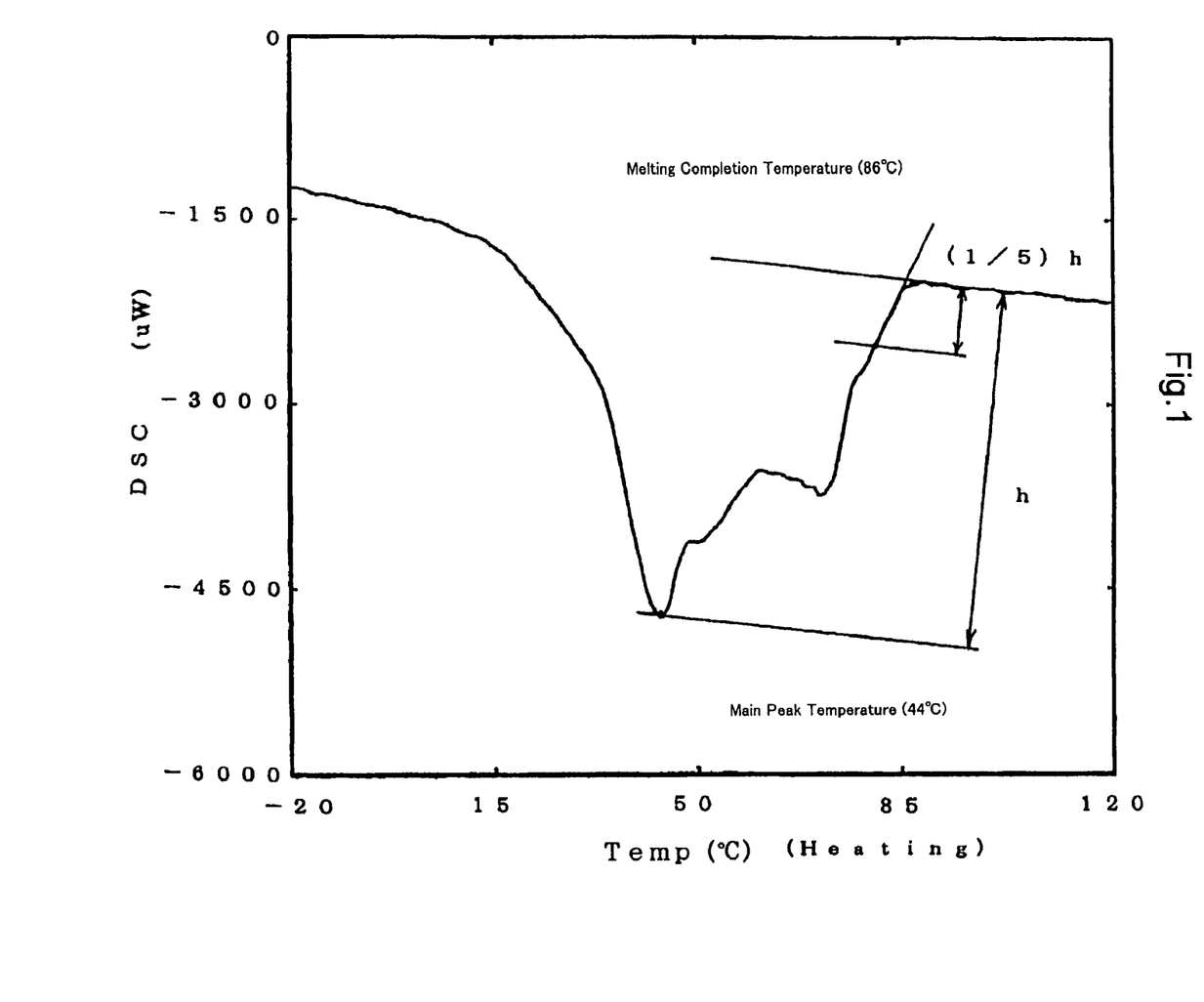
FIG. 1 illustrates how to determine a melting completion temperature and a melting peak temperature from the results of DSC analysis.

Measuring temperature range: An optimal temperature range is chosen depending on the wax to be analyzed. A sample is once melted, cooled at a rate of 5° C./min to crystallize, and re-heated at a rate of 5° C./min. The data recorded during the re-heating are used to obtain the melting completion temperature and the melting peak temperature. For example, a sample is subjected to a first temperature rise of from −30° C. to 130° C., maintained at 130° C. for 5 minutes, cooled from 130° C. to −30°, and subjected to a second temperature rise of from −30° C. up to 130° C. Meanwhile, the data are continuously recorded, and the data during the second temperature rise are made use of. Melting completion temperature: As shown in FIG. 1, a tangent to the base line in the higher temperature side of the melting peak is drawn. An inclining line is drawn from the peak toward the higher temperature side in parallel to the tangent. A tangent is drawn at a point apart from the tangent to the base line by ⅕ the height of from the inclining line to the tangent to the base line. The temperature of the intersection between the two tangents is taken as the melting completion temperature. When the DSC curve has two or more peaks, the peak at the highest temperature is chosen to obtain the melting completion temperature.

Main peak temperature: The peak temperature of the curve is read from the data.

When there are two or more peaks, the peak showing the greatest heat of fusion is chosen as a peak temperature.

ΔH: The total endotherm of all melting peaks.

ΔH': The endotherm in the side of lower temperatures than the mixing temperature The process of producing a wax composition according to the present invention is divided into the step of kneading a wax and a polymer to prepare a wax/polymer composition containing the wax as a main component and kneading a filler into the wax/polymer composition. The step of preparing a wax/polymer composition is divided into a first kneading substep for preparing a masterbatch and a second kneading substep.

In the production of a wax composition according to the present invention, it is significant to once prepare a composition having a wax and a polymer uniformly mixed with each other in the step of preparing a wax/polymer composition prior to the step of kneading a filler.

The process will hereinafter be described with primary reference to the kneading step of preparing a wax/polymer composition.

The first kneading substep is a step of preparing a masterbatch prior to the second kneading substep. The masterbatch contains 5% to 45% by weight of a wax and 55% to 95% by weight of a polymer based on the weight of the masterbatch. What is noteworthy here is that the composition of the masterbatch is reversed in a desired wax composition as a final product aimed in the present invention. That is, the polymer is a main component of the masterbatch with the wax as a secondary component, whereas the wax is a main component of the resulting wax composition with the polymer as a secondary component. The present inventors have found that a wax and a polymer can be mixed up uniformly in a short time by once preparing such a masterbatch and then adding the wax to the masterbatch, followed by kneading. If the wax and the polymer are kneaded together at the mixing ratio as designed for a final wax composition, i.e., if a major proportion of the wax and a minor proportion of the polymer are kneaded together, the two components cannot be mixed up uniformly, and small particles of the polymer would remain in the resulting mixture.

The inventors have found that, when 5% to 45% by weight of the wax and 55% to 95% by weight of the polymer are kneaded as described above, i.e., when a major proportion of the polymer and a minor proportion of the wax are kneaded, they mix easily to provide a masterbatch having the two components mixed uniformly. The wax is then added to the masterbatch to decrease the concentration of the polymer thereby to obtain a desired wax composition in which the wax and the polymer are uniformly mixed.

In the preparation of the masterbatch, various types of kneaders can be used, including a batch type pressure kneader, an open kneader, a twin-screw extruder or a roll kneader. The kneader is preferably designed to cool the mixing chamber and the moving parts, such as a rotor and a screw, to control the temperature during kneading.

When the wax and the polymer are kneaded using a batch kneader, it is desirable that the total volume of the wax and the polymer to be put in the kneader range from 60% to 100%, preferably 75% to 85%, of the capacity of the kneader to induce sufficiently high shear force on the wax and the polymer. The capacity of the kneader is not particularly limited and varies in accordance with the type of the batch kneader employed. An adequate capacity is chosen according to a desired production volume of the wax composition.

In the preparation of the masterbatch, the wax and the polymer are preferably kneaded at a temperature lower than the melting completion temperature of the wax. As long as the mixing temperature is below the melting completion temperature of the wax, there remains wax crystals in their non-molten state so that the wax can be handled seemingly as a highly viscous fluid, which allows for kneading the wax and the polymer in a manner commonly practiced in the preparation of a plastic material compound. Furthermore, because the wax does not drastically reduce in viscosity as it melts, sufficient shear force is exerted on the polymer to achieve sufficient kneading.

In the preparation of the masterbatch, the manner of putting the wax and the polymer into a kneader is not particularly restricted. For example, the whole amount of each of the wax and the polymer may be put in a kneader all at once. Nevertheless, a manner in which the whole amount of the polymer is placed in a kneader, and the wax is then added in divided portions has turned out to be more effective in uniformly mixing the two components.

When the wax is added in divided portions, each portion of the wax preferably ranges from 1% to 15% by weight, more preferably from 2% to 6% by weight, based on the whole amount of the amorphous polymer that has been placed in a kneader. That is, it is preferred that each portion to be added be relatively small. Such divided addition allows for mixing the wax and the polymer more uniformly.

When the wax is added dividedly, it is preferred that the portion to be added in the initial stage of the divided addition be relatively small while the portion to be added in the final stage be relatively large. It is more preferred that the portion increase gradually with the number of times of addition. Such strategy of divided addition results in reduction of the kneading time. Reduction in kneading time not only leads to reduction in production cost but is particularly effective to prevent the polymer from reducing its molecular weight due to the shear force and the like.

When a batch type pressure kneader is used in the preparation of the masterbatch, kneading is preferably carried out first with no pressure applied for a predetermined period of time and then with pressure applied using a pressure lid, etc. for another predetermined period of time each time a portion of the wax is added. By this manner of kneading, the wax and the polymer are mixed more uniformly. It is more preferred for even more uniform mixing that the time of kneading under pressure be longer than the time of kneading with no pressure. Specifically, the time of kneading with no pressure is preferably 0.5 to 5 minutes, more preferably 0.5 to 2 minutes, while the time of kneading under pressure is preferably 0.5 to 10 minutes, more preferably 1 to 3 minutes.

When kneading is conducted using a continuous twin-screw kneader, the above-described kneading with no pressure applied is not always necessary.

A masterbatch is obtained as a result of the above-described series of operations of the first kneading substep. The resulting masterbatch is then subjected to the second kneading substep in which the masterbatch and the wax are kneaded. The masterbatch is once taken out of the kneader and transferred into another kneader for the second kneading substep. The kneader to be used in the second kneading substep is chosen from those recited above for use in the first kneading substep. The kneader that has been used in the first kneading substep may be used successively. Even in the latter case, it is preferred that the masterbatch be once taken out of the kneader, and a part of it be returned to the kneader for the following reason. As stated previously, it is preferred that the total volume of the wax and the polymer which are charged into the kneader be 60% to 100% of the capacity of the mixing chamber of the kneader in order to mix them with sufficient shear force. Accordingly, the mixing chamber of the kneader has been substantially filled with a quantity of the masterbatch at the end of the first kneading substep. If the masterbatch is not taken out, there can be no room to add an additional amount of the wax.

In order to mix the wax and the masterbatch with a sufficient shear force, it is desirable that the total volume of the wax and the masterbatch put in the kneader be 60% to 100%, more preferably 80% to 90%, of the capacity of the kneader in the second kneading substep similarly to the first kneading substep.

The temperature conditions during the kneading are set to be the same as in the first kneading substep. The kneading is preferably carried out at temperature lower than the wax's melting completion temperature. It is also preferred to carry out the kneading at or above the wax's glass transition temperature. It is also preferred to conduct the kneading at or above the Tm or the glass transition temperature of the polymer.

The manner of putting the wax and the masterbatch into a kneader in the second kneading substep is not particularly restricted. For example, the whole amount of each of the wax and the masterbatch may be fed in a kneader all at once. Otherwise, the whole amount of the masterbatch is put in a kneader, and the wax is then added in divided portions. The latter manner of addition is advantageous for uniformly mixing the wax and the masterbatch, which is the same as in the first kneading substep.

When the wax is added in divided portions, it is preferred that each portion to be added be relatively small. Specifically, each portion of the wax is preferably 5% to 50% by weight, more preferably 6% to 30% by weight, based on the whole amount of the masterbatch that has been placed in the kneader. Such divided addition allows for mixing the wax and the masterbatch more uniformly.

When the wax is added dividedly, it is preferred that the portion to be added in the initial stage of the divided addition be relatively small while the portion to be added in the final stage be relatively large. It is more preferred that the portion increase gradually with the number of times of addition. Such strategy of divided addition results in reduction of the kneading time similarly to the preparation of the masterbatch.

When a batch type pressure kneader is used in the second kneading substep, each time a portion of the wax is added, kneading is preferably carried out first with no pressure applied for a predetermined period of time and then with pressure applied using a pressure lid, etc. for another predetermined period of time which is the same as in the first kneading step. By this manner of kneading, the wax and the masterbatch are mixed more uniformly. It is more preferred for even more uniform mixing that the time of kneading under pressure be longer than the time of kneading with no pressure. Specifically, the time of kneading with no pressure is preferably 0.5 to 5 minutes, more preferably 0.5 to 2 minutes, while the time of kneading under pressure is preferably 0.5 to 10 minutes, more preferably 1 to 5 minutes. When in using a continuous twin-screw kneader, the above-described kneading with no pressure applied is not always necessary.

A wax composition having the wax and the polymer uniformly mixed, i.e., a wax/polymer composition is thus obtained as a result of the above-described series of operations of the second kneading substep. The resulting wax composition sometimes contains air bubbles entrapped during kneading. To remove the bubbles, the wax composition may be deaerated by usual techniques. For example, deaeration is performed by maintaining the wax composition in a thermostat at or above the melting completion temperature of the wax under reduced pressure. Deaeration may also be achieved by performing the kneading operation at or above the wax's melting completion temperature under reduced pressure in a kneader equipped with evacuation means.

A filler is poured into the wax composition (i.e., the wax/polymer composition) obtained in the second kneading substep either all at once or in divided portions. The system is preferably kneaded first with no pressure applied for a predetermined period of time and then with pressure applied using, e.g., a pressure lid for another predetermined period of time. The wax composition obtained in the second kneading substep and the filler are thus kneaded together uniformly.

When a twin-screw kneader or a like apparatus is used for kneading, deaeration may be accomplished by providing an evacuation zone heated at or above the wax's melting completion temperature at the rear of the mixing zone controlled below the wax's melting completion temperature. It is also possible to use a combination of two or more twin-screw extruders or a combination of a twin-screw extruder and a single-screw extruder to perform mixing and deaeration in the respective extruders. Understandably, deaeration is not always needed depending on the use of the wax composition or the processing step added to the wax composition after the second kneading substep.

When natural rubber or isoprene rubber is used as a compounding component, it is preferred that the wax composition be heated at or above the melting completion temperature of the wax so as to make the wax/polymer disperse state more uniform.

The process of production according to the present invention makes it feasible to uniformly disperse a compounding component in a wax to provide the wax composition of the present invention in a short time at good yield. In particular, when a wax and natural rubber or isoprene rubber are mixed, natural rubber or isoprene rubber can be dispersed extremely uniformly even though the wax is in a non-molten state. The production process of the present invention is suited to the production of the biodegradable wax composition of the present invention.

The wax composition obtained by the process of the present invention is especially suitable as a wax-based composition for moistureproofing or adhesion. Since the process of the present invention provides a wax composition without using any organic solvent, use of the wax composition obtained by the process in a wide variety of applications typified by food packaging materials provides extremely safe products.

EXAMPLES

The present invention will now be illustrated in greater detail with reference to Examples, but it should be understood that the invention is not deemed to be limited thereto.

Example 1-1

Microcrystalline wax (Hi-Mic-1070, available from Nippon Seiro Co., Ltd.; melting completion temperature: 86° C.; main peak temperature: 44° C.) was freeze-crushed in a crusher into 10 mm or smaller particles. Isoprene rubber (Nipol-IR2200, available from Zeon Corp.) was cut into pieces of size ready to put in a kneader.

A pressure kneader (DS.DX75, supplied by Moriyama Manufacturing Co., Ltd.) was used. Into the mixing chamber of the pressure kneader was put 41.5 kg of the isoprene rubber. Then, 12.5 kg of the microcrystalline wax was added thereto in 10 divided portions, each portion falling within a range of 2% to 6% of the whole amount of the isoprene rubber. Each time a portion of the wax was added, the system was kneaded with no pressure application for about 0.5 minutes and then under pressure for 1.5 or 2 minutes. During the kneading, cooling water at about 15° C. was circulated around the mixing chamber and the rotor, and all the heaters were off.

The resulting masterbatch looked white with air bubbles and was proved to have a uniform disperse state. The masterbatch was melted in a drier at 110° C. in a nitrogen stream and again observed to examine the disperse state of the components. The presence of non-dispersed isoprene rubber was not recognized.

In the second kneading substep, 26.0 kg of the resulting masterbatch was put in a mixing chamber of a pressure kneader of Moriyama Mfg. Co., Ltd., and 54 kg of the microcrystalline wax was added thereto in 11 divided portions each ranging from 6% to 30% of the total amount of the masterbatch. Each time a portion of the wax was added, the system was kneaded with no pressure applied for about 0.5 minutes and then under pressure for 1.5 or 2 minutes. During the kneading, cooling water at about 15° C. was circulated around the mixing chamber and the rotor, and all the heaters were off.

The resulting wax composition was white with entrapped air bubbles. It was confirmed that each component was dispersed uniformly. The resulting composition was deaerated in a drier at 110° C. in a nitrogen stream under reduced pressure of −500 mmHg (−66.6 KPa), and the disperse state in the molten composition was again examined. As a result, the composition was transparent and uniform, and the presence of non-dispersed isoprene rubber was not recognized.

Fifty grams of the resulting wax composition and 2.6 g of anhydrous silica particles (AEROSIL 200, available from Nippon Aerosil Co., Ltd.; average particle size: 12 μm) as a filler were fed into the mixing chamber of Laboplastomill 30C150 (from Toyo Seiki Seisakusho) and kneaded at 30 rpm for 10 minutes with all the heaters off to obtain a filler-loaded wax composition.

A layer of the wax composition was sandwiched between two films of a biodegradable resin (PHB05, available from Daicel Chemical Industries, Ltd.; a polyblend of polycaprolactone and polyethylene succinate), and the laminate was pressed on a pressing machine to give a three-layered biodegradable film. The resulting biodegradable film had a total thickness of 350 μm, in which the thicknesses of the wax composition layer and each biodegradable resin film were 150 μm and 100 μm, respectively.

Example 2-1

In the mixing chamber of a pressure kneader (DSO.3-3 from Moriyama Mfg. Co., Ltd.) were put 1800 g of the microcrystalline wax (Hi-Mic-1070 from Nippon Seiro Co., Ltd.) and 600 g of isoprene rubber (Nipol-IR2200 from Zeon Corp.) and kneaded at 20 rpm for 5 minutes. An additional 600 g of the same wax was added, followed by kneading for an additional 10 minute period to obtain a filler-free wax composition. During the kneading, cooling water at about 10° C. was circulated around the mixing chamber and the rotor, and all the heaters were off.

Fifty grams of the resulting filler-free wax composition and 2.6 g (5 wt %) of anhydrous silica particles (AEROSIL 200 from Nippon Aerosil Co., Ltd.; average particle size: 12 μm) as a filler were fed into the mixing chamber of Laboplastomill 30C150 (from Toyo Seiki Seisakusho) and kneaded at 30 rpm for 10 minutes with all the heaters off to obtain a filler-loaded wax composition.

A layer of the wax composition was sandwiched between two films of a biodegradable resin (PHB05 from Daicel Chemical Industries, Ltd.; a polyblend of polycaprolactone and polyethylene succinate), and the laminate was pressed on a pressing machine to give a three-layered biodegradable film. The resulting biodegradable film had a total thickness of 350 μm, in which the thicknesses of the wax composition layer and each biodegradable resin film were 150 μm and 100 μm, respectively.

Example 2-2

A filler-loaded wax composition and a three-layered film were prepared in the same manner as in Example 2-1, except for changing the amount of the anhydrous silica particles to 10% by weight.

Example 2-3

A filler-loaded wax composition and a three-layered film were prepared in the same manner as in Example 2-1, except for replacing the anhydrous silica particles with lipophilized anhydrous silica (AEROSIL R972, available from Nippon Aerosil Co., Ltd.; average particle diameter of primary particles: 16 μm). The amount of the lipophilized anhydrous silica added was 5% by weight.

Example 2-4

A filler-loaded wax composition and a three-layered film were prepared in the same manner as in Example 2-2, except for replacing the anhydrous silica particles with lipophilized anhydrous silica (10 wt %).

Example 2-5

A filler-loaded wax composition and a three-layered film were prepared in the same manner as in Example 2-2, except for using as a filler lipophilic mica (Somasif MAE, available from Co-op Chemical Co., Ltd.; average particle diameter: 6 μm). The amount of the lipophilic mica added was 10% by weight.

Comparative Example 2-1

The filler-free wax composition of Example 2-1 was kneaded alone in Laboplastomill to obtain a filler-free wax composition having undergone the same kneading history as in Examples 2-1 to 2-5, which was processed in the same manner as in the foregoing Examples to obtain a three-layered film.

Evaluation of Performance

The wax compositions thus obtained were measured for moisture permeability and MFR by the aforementioned methods. The results obtained are shown in Table 1 below. The moisture permeability of the wax compositions was calculated from the measured moisture permeability of the three-layered film and that of a 100 μm thick film of the biodegradable resin PHB05 (=132 g/m²·24 hr).

TABLE 1

|  | Wax (wt %) | Polyisoprene (wt %) | Filler (wt %) | | | MFR (g/10 min) | Moisture Permeability | |
|---|---|---|---|---|---|---|---|---|
|  |  |  | Aerosil 200 | Aerosil R972 | Mica |  | 3-Layered Film (g/mm²·24 hr) | Wax Composition (g·mm/m²·24 hr) |
| Example 1-1 | 76 | 19 | 5 | — | — | 196 | 7.0 | 1.3 |
| Example 2-1 | 76 | 19 | 5 | — | — | 210 | 6.7 | 1.2 |
| Example 2-2 | 72 | 18 | 10 | — | — | 32 | 7.6 | 1.3 |
| Example 2-3 | 77.6 | 19.4 | — | 5 | — | 250 | 7.8 | 1.3 |
| Example 2-4 | 72 | 18 | — | 10 | — | 61 | 8.8 | 1.5 |
| Example 2-5 | 72 | 18 | — | — | 10 | 380 | 8.3 | 1.4 |
| Comparative Example 2-1 | 80 | 20 | — | — | — | 1800 | 4.5 | 0.7 |

As is apparent from Table 1, it is seen that the wax compositions of Examples 1-1 and 2-1 to 2-5 have a high MFR and low moisture permeability and provide biodegradable films having low moisture permeability. While not shown in the table, the wax compositions and the biodegradable films of Examples were verified to be biodegradable.

The following test was carried out in which the kneading conditions in the preparation of a wax/polymer composition were varied. It is particularly important in the production of the wax composition of the present invention how to accomplish a uniformly mixed state in the step of kneading to obtain a wax/polymer composition prior to the step of kneading a filler.

In Example 3-1 and Comparative Examples 3-1 and 3-2 a wax composition was prepared using a 75-liter pressure kneader. The uniformity of the disperse system was evaluated as follows. The resulting composition was deaerated by heating to or above the melting point of the wax and spread to a thickness of about 1 mm to see if any granular substance remained with the naked eye. When the presence of a granular substance was recognized, the substance was judged to be non-dispersed. To confirm the physical properties of the composition, the MFR was measured with a melt flow indexer at 125° C. under a 1.2 kgf (11.76N) load.

Example 3-1

Microcrystalline wax (Hi-Mic-1070 from Nippon Seiro Co., Ltd.; melting completion temperature: 86° C.; main peak temperature: 44° C.) was freeze-crushed in a crusher into 10 mm or smaller particles. Isoprene rubber (Nipol-IR2200 from Zeon Corp.) was cut into pieces of size ready to put in a kneader.

The input quantity to be charged into a pressure kneader in the first kneading substep was calculated from "80% of the capacity of the mixing chamber", "a specific gravity of 0.9", and "an isoprene rubber to microcrystalline wax ratio of 100 to 30 by part by weight".

Input quantity=75 L (capacity of pressure kneader)× 0.8×0.9 (specific gravity)

Into the mixing chamber of a pressure kneader (DS.DX75, supplied by Moriyama Manufacturing Co., Ltd.) was put 41.5 kg (100 parts by weight) of the isoprene rubber (Nipol-IR2200 from Zeon Corp.) and kneaded at 30 rpm for 4 minutes. Then, 12.5 kg (30 parts by weight) of the microcrystalline wax (Hi-Mic-1070 from Nippon Seiro Co., Ltd.) was added thereto in 10 divided portions, each portion falling within a range of 2% to 6% of the isoprene rubber. Each time a portion of the wax was added, the system was kneaded with no pressure application for about 0.5 minutes and then under pressure for 1.5 or 2 minutes. During the kneading, cooling water at about 15° C. was circulated around the mixing chamber and the rotor, and all the heaters were off. The temperature of the composition after the end of the kneading was 60° to 70° C. as measured with a contact thermometer, and the ΔH'/ΔH at that time was 0.70 to 0.85.

The resulting masterbatch looked white with entrapped air bubbles and was confirmed to have the components uniformly dispersed. The masterbatch was melted in a drier at 110° C. in a nitrogen stream and again observed to examine the disperse state of the components. The presence of non-dispersed isoprene was not recognized.

Prior to carry out the second kneading substep, the whole amount of the resulting masterbatch was taken out of the mixing chamber and weighed. The input quantity to be put in a pressure kneader in the second kneading substep was calculated from "90% of the capacity of the mixing chamber", "a specific gravity of 1.0", and "an isoprene rubber to microcrystalline wax ratio of 130 to 205 by part by weight".

Input quantity=75 L (capacity of pressure kneader)× 0.9×1.0 (specific gravity)

In the mixing chamber of a pressure kneader (DS.DX75, supplied by Moriyama Manufacturing Co., Ltd.) was put 26.0 kg (130 parts by weight) of the masterbatch and kneaded at 30 rpm for 5 minutes. Then, 46.5 kg (205 parts by weight) of the microcrystalline wax (Hi-Mic-1070 from Nippon Seiro Co., Ltd.) was added thereto in 11 divided portions, each portion falling within a range of 6% to 30% based on the total amount of the masterbatch. Each time a portion of the wax was added, the system was kneaded with no pressure application for about 0.5 minutes and then under pressure for 1 or 2 minutes or 5 minutes. During the kneading, cooling water at about 15° C. was circulated around the mixing chamber and the rotor, and all the heaters were off. The temperature of the composition after the end of the kneading was 60° to 70° C. as measured with a contact thermometer, and the ΔH'/ΔH at that time was 0.70 to 0.85.

The resulting wax composition looked white with air bubbles and was confirmed to have the components uniformly dispersed therein. The composition was deaerated in a drier at 110° C. in a nitrogen stream at −500 mmHg (−66.6 KPa) and again observed to examine the disperse state in the molten state. The composition was transparent and uniform, and the presence of non-dispersed isoprene rubber was not recognized. To confirm the physical properties of the kneaded product, MFR was measured with a melt flow indexer at 125° C. under 1.2 kgf (11.76N) load. As a result, the MFR was about 37 g/10 min.

Comparative Example 3-1

Isoprene and microcrystalline wax were kneaded in a pressure kneader (DS.DX75, supplied by Moriyama Manufacturing Co., Ltd.) at a ratio of 30%/70%, which was the ratio of a wax-based composition to be prepared. The input quantity to be put in the pressure kneader was calculated from "90% of the capacity of the mixing chamber", "a specific gravity of 1.0", and "an isoprene rubber to microcrystalline wax ratio of 100 to 235 by part by weight".

In the mixing chamber of the pressure kneader were placed 20.0 kg (100 parts by weight) of isoprene rubber (Nipol-IR2200, available from Zeon Corp.) and kneaded at 30 rpm for 5 minutes. Then, 47.5 kg (235 parts by weight) of microcrystalline wax (Hi-Mic-1070 from Nippon Seiro Co., Ltd.) was added thereto in 6 divided portions each ranging from 30% to 60% of the total amount of the isoprene rubber. Each time a portion of the wax was added, the system was kneaded with no pressure applied for about 0.5 or 2 minutes and then under pressure for 1, 2 or 5 minutes. During the kneading, cooling water at about 15° C. was circulated around the mixing chamber and the rotor, and all the heaters were off. The temperature of the composition after the end of the kneading was 40° to 50° C. as measured with a contact thermometer, and the ΔH'/ΔH at that time was 0.26 to 0.50.

The resulting composition was semi-transparent with entrapped air bubbles, and the presence of non-dispersed isoprene rubber was confirmed with the naked eye. The composition was deaerated in a drier at 110° C. in a nitrogen stream at −500 mmHg (−66.6 KPa) and again observed to examine the disperse state of the components in the molten state. The presence of non-dispersed isoprene rubber was recognized with the naked eye. The MFR measurement was not made in view of such a large quantity of the non-dispersed isoprene rubber.

Comparative Example 3-2

Isoprene and microcrystalline wax were kneaded in a pressure kneader (DS.DX75, supplied by Moriyama Manufacturing Co., Ltd.) at a ratio of 30%/70%, which was the ratio of a wax-based composition to be prepared. The input quantity to be put in the pressure kneader was calculated from "90% of the capacity of the mixing chamber", "a specific gravity of 1.0", and "an isoprene rubber to microcrystalline wax ratio of 100 to 235 by part by weight".

In the mixing chamber of the pressure kneader were placed 20.0 kg (100 parts by weight) of isoprene rubber (Nipol-IR2200, available from Zeon Corp.) and kneaded at 30 rpm for 5 minutes. Then, 47.5 kg (235 parts by weight) of microcrystalline wax (Hi-Mic-1070 from Nippon Seiro Co., Ltd.) was added thereto in 10 divided portions each ranging from 4% to 30% of the total amount of the isoprene rubber. Each time a portion of the wax was added, the system was kneaded with no pressure applied for about 0.5 or 2 minutes and then under pressure for 1, 2 or 5 minutes. During the kneading, cooling water at about 15° C. was circulated around the mixing chamber and the rotor, and all the heaters were off. The temperature of the composition after the end of the kneading was 40° to 50° C. as measured with a contact thermometer, and the ΔH'/ΔH at that time was 0.26 to 0.50.

The resulting composition was semi-transparent with entrapped air bubbles, and the presence of non-dispersed isoprene rubber was confirmed with the naked eye. The composition was deaerated in a drier at 110° C. in a nitrogen stream at 500 mmHg (−66.6 KPa) and again observed to examine the disperse state of the components in the molten state. The presence of non-dispersed isoprene rubber was recognized with the naked eye. To confirm the physical properties of the kneaded product, the kneaded product was freed of the non-dispersed isoprene rubber, and its MFR was measured with a melt flow indexer at 125° C. under 1.2 kgf (11.76N) load. As a result, the MFR was about 104 g/10 min. It was thus revealed that the resulting composition had an increased MFR value as compared with the composition of Example 3-1 in which a masterbatch was once prepared.

INDUSTRIAL APPLICABILITY

The production process of the present invention provides a wax composition having the constituent components uniformly dispersed therein in a short time at a low cost in a good yield.

The wax composition of the present invention is excellent in moistureproofing performance and easy to melt mold. Use of the wax composition allows for production of a biodegradable and highly moistureproof film.

The invention claimed is:

1. A process of producing a wax composition comprising a microcrystalline wax, polyisoprene rubber or natural rubber as a polymer, and a filler, said process comprising:
   kneading the microcrystalline wax and the polymer to prepare a wax/polymer composition comprising 50-95% by weight of the microcrystalline wax and 5-50% by weight of the polymer, wherein said kneading comprises
      a first kneading substep to prepare a masterbatch comprising 5% to 45% by weight of the microcrystalline wax and 55% to 95% by weight of the polymer, and
      a second kneading substep in which an additional amount of the microcrystalline wax is added to the masterbatch followed by further kneading; and
   kneading a filler into the wax/polymer composition;
   wherein
      the first kneading substep is carried out by kneading the microcrystalline wax and the polymer at a temperature lower than the melting completion temperature of the microcrystalline wax, the first kneading substep is carried out by putting the whole amount of the polymer in a kneader all at once and then adding the microcrystalline wax thereto in divided portions, and the second kneading substep is carried out by putting the whole amount of the masterbatch in a kneader all at once and then adding the microcrystalline wax thereto in divided portions.

2. The process of producing a wax composition according to claim 1, wherein the divided portions of the microcrystalline wax in the first kneading substep each range from 1% to 15% by weight of the whole amount of the polymer.

3. The process of producing a wax composition according to claim 1, wherein the portion of the microcrystalline wax in the first kneading substep increases gradually with the number of times of adding the microcrystalline wax.

4. The process of producing a wax composition according to claim 1, wherein the first kneading substep is carried out by kneading the microcrystalline wax and the polymer in a batch kneader, the total amount of the microcrystalline wax and the polymer to be put in the batch kneader being 60% to 100% of the capacity of the kneader.

5. The process of producing a wax composition according to claim 1, wherein the second kneading substep is carried out by kneading the microcrystalline wax and the masterbatch at a temperature lower than the melting completion temperature of the microcrystalline wax.

6. The process of producing a wax composition according to claim 1, wherein the divided portions of the microcrystalline wax in the second kneading substep each range from 5% to 30% by weight of the whole amount of the masterbatch.

7. The process of producing a wax composition according to claim 1, the portion of the microcrystalline wax in the second kneading substep increases gradually with the number of times of adding the microcrystalline wax.

8. The process of producing a wax composition according to claim 1, wherein the second kneading substep is carried out by kneading the microcrystalline wax and the masterbatch in a batch kneader, the total amount of the microcrystalline wax and the masterbatch to be put in the batch kneader being at least 60% of the capacity of the kneader.

\* \* \* \* \*